Figure 5:
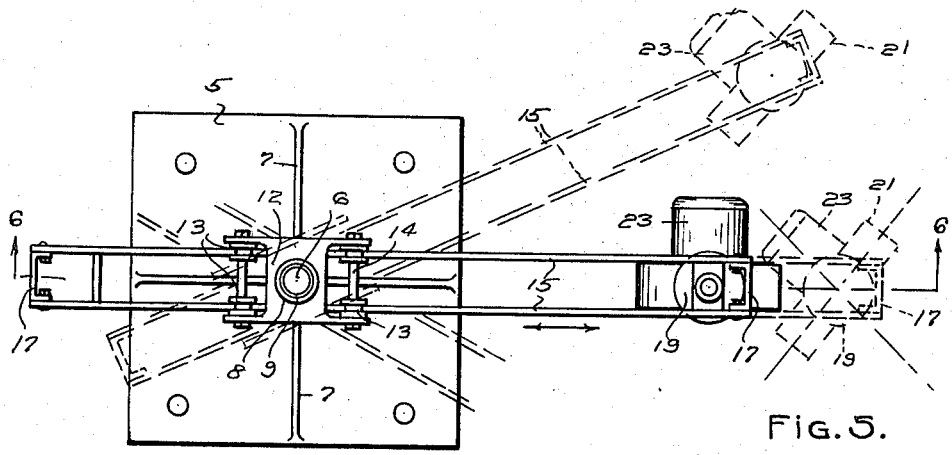

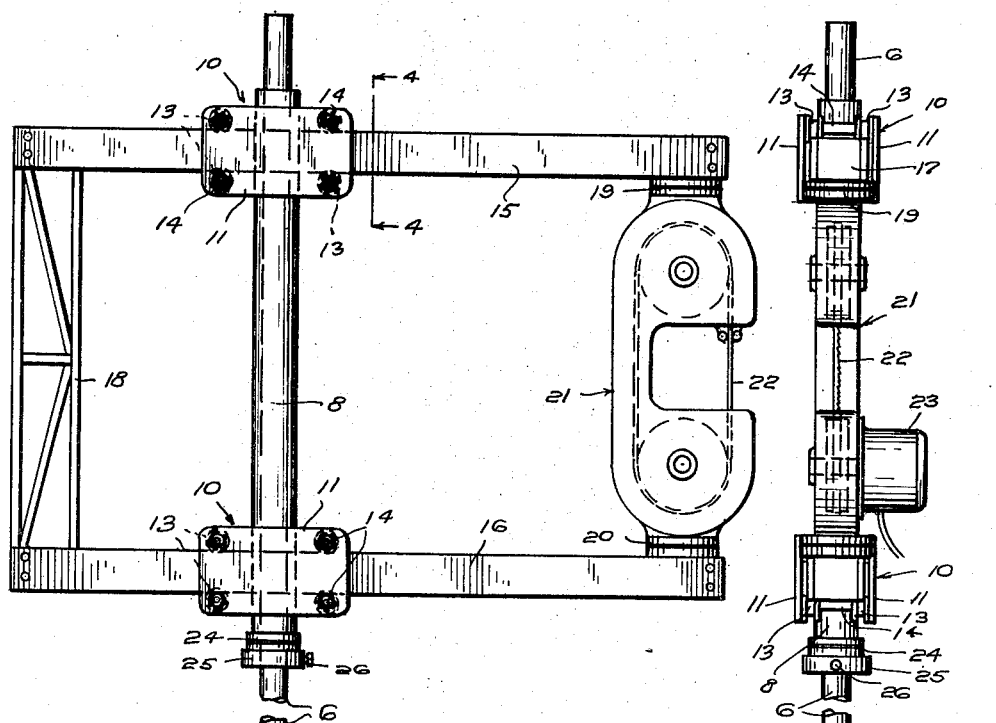
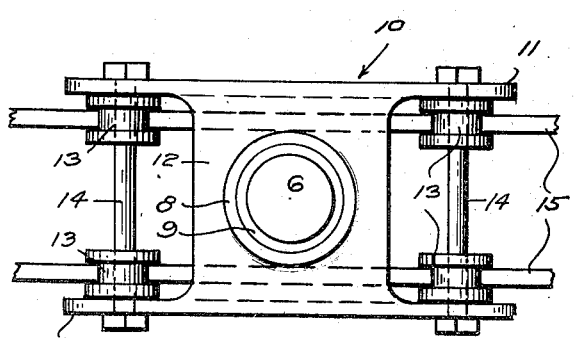
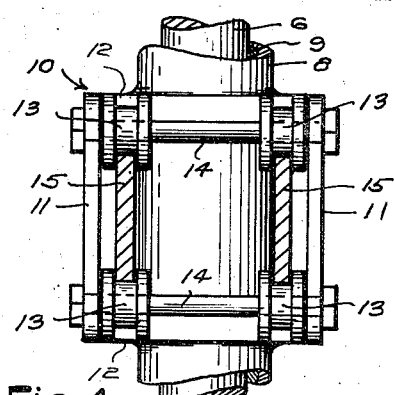

May 29, 1951

F. E. PENCE 2,555,056

SHIFTABLE AND ROTATABLE BAND SAW FOR CUTTING RAFTER ENDS

Filed Aug. 14, 1950

2 Sheets-Sheet 2

INVENTOR.
FRANK E. PENCE,
BY
ATTORNEY

Patented May 29, 1951

2,555,056

UNITED STATES PATENT OFFICE 2,555,056

SHIFTABLE AND ROTATABLE BAND SAW
FOR CUTTING RAFTER ENDS

Frank E. Pence, Oakland Park, Fla.

Application August 14, 1950, Serial No. 179,236

2 Claims. (Cl. 143—17)

1

This invention relates to woodworking machinery and has particular reference to a band saw and the support therefore.

It is an object of the present invention to provide a supporting mechanism for a conventional band saw, whereby the band saw may be shifted bodily in a horizontal plane toward and from a timber to be cut and further means whereby the band saw is mounted to rotate about a vertical axis in such manner, that the saw may be turned through an arc of 360 degrees to follow a particular line of cut, the combined horizontal shifting and the rotary motion enabling the cutting of a timber in any normal design with relatively little effort.

The invention is particularly adaptable in cutting rafter ends or the like upon timbers of considerable length.

The invention contemplates a rigid standard about which a shiftable saw supporting frame is adapted to rotate in either direction, with the standard supporting novel antifriction bearings for the horizontal shifting of the saw support and with the shiftable frame having mounted at one extremity, a conventional band saw that is rotatable upon the frame on a vertical axis and having suitable thrust bearing above and below to facilitate its rotary motion.

Novel features of construction and operation will be readily apparent during the course of the following description, reference being had to the accompanying drawings, wherein like characters of reference are employed to denote like parts throughout the several figures.

Figure 6:
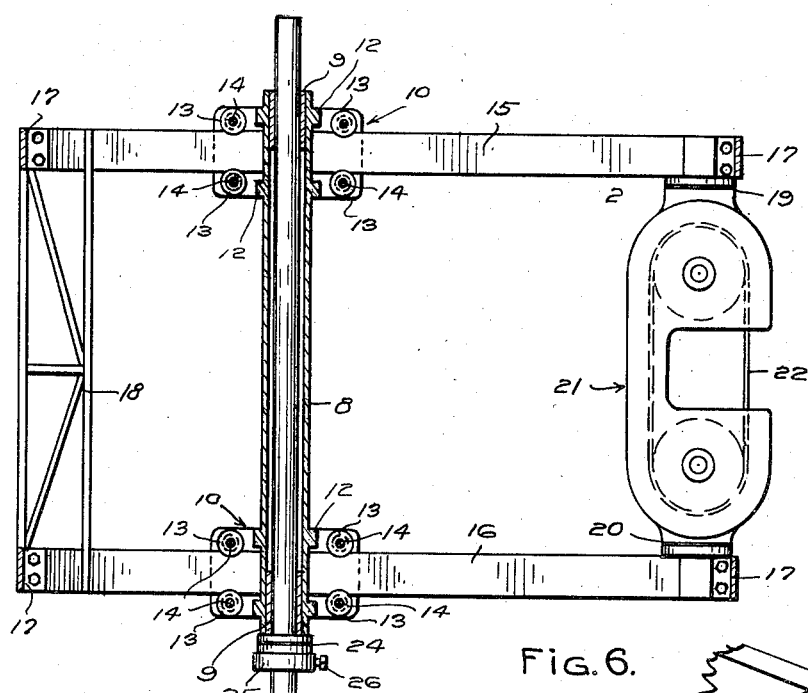
Figure 7:
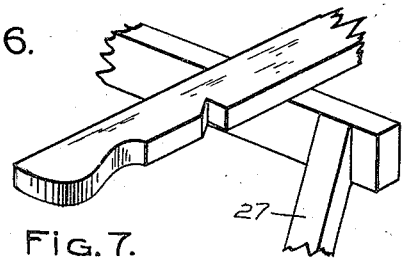

In the drawings:

Figure 1 is a side elevation of a device constructed in accordance with the invention, Figure 2 is an end view thereof, Figure 3 is an enlarged top plan view of a frame bearing that supports the horizontal shifting movement of a saw frame, Figure 4 is an enlarged transverse vertical section, taken on line 4—4 of Figure 1, Figure 5 is a top plan view of the device, Figure 6 is a central vertical sectional view of the device, taken on line 6—6 of Figure 5 and, Figure 7 is a perspective view illustrating an example of design cutting possible with the device.

Referring specifically to the drawings, the numeral 5 designates a base plate of metal and here shown as being square in top plan. However, the shape and size of the plate will be determined in accordance with the overbalancing weight of a band saw, to be described. The plate 5 may be bolted to the floor or to any other desirable surface or, when the device is transported from job to job, the plate may be bolted to a timber base.

Fixed with respect to the base plate 5, as by welding, is a perpendicular cylindrical standard 6 of any desirable height. The standard 6 is held against twisting with respect to the base 5, by webbing 7. For permanent installations of the machine, the upper end of the standard may be held in a bracket or other support against any tendency to tilt, although it is the primary purpose of the device to be constructed in a manner and of a size to be transported from place to place.

Rotatable and vertically adjustable upon the standard, is a tubular bearing support 8, provided adjacent its upper and lower ends with preferably bronze bushings 9, that provide the rotatable bearing surface between the standard 6 and the support 8. Preferably formed integral with the support 8, adjacent its upper and lower ends, are bar bearings, designated as a whole, by the numeral 10. Each bearing 10 embodies a pair of vertically arranged and parallel side plates 11, spaced outwardly of the sides of the support 8 and rigidly tied thereto by webs 12. The plates are generally rectangular in shape and the plates of the upper and lower bearings 10 are in vertical alignment.

Grooved rollers 13, supported upon cross shafts 14, are arranged adjacent the four corners of the plates 11. The shafts 14 are supported in suitable openings of the plates 11. As shown, each bearing 10 embodies eight rollers, four for each plate and each group of four rollers support a horizontally shiftable bar 15. As shown, the spacing of the plates 11 from the sides of the support 8, provide a clearance for the shiftable support of the bars 15. The rollers 13 may have any desirable antifriction bearing upon the shafts 14.

The saw supporting frame embodies a pair of upper spaced parallel bars 15 and a pair of lower spaced parallel bars 16, the upper and lower pairs of bars being parallel with each other. At their rear ends, each pair of bars are rigidly tied together by angle brackets 17, bolted thereto. A truss member 18 may be employed to add additional rigidity to the frame as a whole. The opposite ends of the pairs of bars 15 and 16, jointly support, through the medium of upper and lower thrust bearings 19 and 20, a conventional band saw structure, designated as a whole by the numeral 21. The band saw 21 embodies upper and lower heads that support the usual band saw pulleys, carrying the endless saw blade 22. The band saw is driven through the medium of an electric motor 23. Since the particular use to which the saw 21 is to be put, the conventional saw table is removed, as the timber to be cut is supported on a structure remote from the invention. The upper and lower thrust bearings 19 and 20 are detachably supported between the pairs of bars 15 and 16 adjacent their outer or forward ends. The band saw structure 21 is therefore capable of being bodily rotated upon a vertical axis through the entire 360 degrees.

The support 8 is freely rotatable upon the standard 6 through the medium of the bronze bushings 9 and a thrust bearing 24, while the entire shiftable structure is supported at the required elevation upon the standard 6, by a collar 25, shiftable upon the standard and fixed after adjustment, by a set screw 26.

In the use of the device after it has been transported to the desired location and rigidly bolted down by the plate 5, the timber to be cut is supported adjacent the machine, upon trestles or other supports 27, as indicated in Figure 7. Since timbers, such as roof rafters, are relatively long, they will be supported at a plurality of points, with the end to be cut projecting beyond to a point within the range of the saw. The proper design having been drawn upon the flat side of the timber, the operator pulls the saw toward the work, such motion being permitted by the shifting movement of the pairs of bars 15 and 16 through their grooved bearing rollers 13. The saw having been placed in operation, the operator then turns the saw bodily upon its bearings 19 and 20, guiding the saw around the design. The joint movement of the frame and the saw enables the operator to rotate the saw and shift it toward and from the work as will be determined by the configuration of the design. The grouping of the rollers 13 provide a relatively wide bearing for the upper and lower edges of the bars 15 and 16 and avoid any tendency for the saw supporting frame to tilt or sag downwardly throughout its range of horizontal shifting. Certain of the rollers 13 may be mounted upon shafts 14 that are eccentrically adjustable to facilitate adjustment due to wear upon either the rollers or the edges of the bars.

It will be apparent from the foregoing, that a very novel and highly efficient machine has been provided to quickly and easily cut rafter ends or the like upon timbers of considerable length. The cutting of such timber ends heretofore has been exceedingly difficult and time consuming and has led many builders to avoid the exposed rafter ends, due primarily to the cost of labor in cutting. With the machine of the present invention, such rafters may be cut upon the job with a minimum of effort and labor cost and the machine is of such nature and of such light weight as facilitates its transfer from job to job. The structure is simple, cheap to manufacture, is strong, durable, easily assembled or disassembled and is highly economical in use.

While a preferred embodiment of the invention has been illustrated and described, it will be understood, that various changes in the shape, size and arrangement of parts may be resorted to as fall within the scope of the invention, as determined by the appended claims.

Having described my invention, what I claim as new and desire to secure by Letters Patent is:

1. A wood sawing machine for cutting scrolled ends on long stationary timbers, that includes a flat base plate having a perpendicular cylindrical standard rigid therewith, a carriage supporting sleeve rotatable and vertically adjustable upon the standard, upper and lower bearings formed upon the sleeve, anti-friction rollers carried by the bearings, the bearings being in alignment with each other vertically, upper and lower pairs of carriage bars shiftable through the bearings in engagement with the rollers, the pairs of bars being rigidly tied together at one end, a band saw having upper and lower thrust bearings supported by the upper and lower pairs of bars, the band saw being rotatable upon a vertical axis with respect to the bars, the carriage being shiftable radially and rotatable in a horizontal plane and the band saw being independently rotatable upon its vertical axis and movable with the carriage toward and from the standard and movable with the carriage in a horizontal swinging movement.

2. A wood sawing machine for cutting scrolled ends on long stationary timbers, the saw being movable toward and from the timber and in an arcuate path to engage the timber at all degrees of angularity, a base plate provided with a perpendicular cylindrical standard rigid with the base, a carriage supporting sleeve vertically adjustable upon the standard and rotatable thereon, bushings positioned in the sleeve for rotatable contact with the standard, upper and lower bearing members formed upon the sleeve adjacent its opposite ends, each bearing including rectangular parallel side plates spaced from the sleeve, shafts extending between the plates at each of its corners, grooved rollers rotatable on the shafts adjacent each side plate, a carriage including upper and lower pairs of spaced parallel bars, the plates of the upper and lower bearings and the upper and lower pairs of bars being parallel and in alignment with each other vertically, the bars shiftable through the bearings in antifrictional contact with the grooves of the rollers, the bars at one end being rigidly braced with each other and with the upper and lower pairs of bars being rigidly tied together, a band saw adapted to be supported upon the opposite ends of the bars jointly, the band saw adapted to rotate upon a vertical axis and thrust bearings at the upper and lower ends of the band saw for connection with the upper and lower pairs of bars, the carriage shiftable in a horizontal plane through the bearings of the sleeve and rotatable in a horizontal plane with the sleeve and the band saw rotatable on its vertical axis independent of the carriage but shiftable with the carriage throughout its traverse.

FRANK E. PENCE.

REFERENCES CITED

The following references are of record in the file of this patent:

UNITED STATES PATENTS

| Number | Name | Date |
| --- | --- | --- |
| 2,022,289 | Knapp | Nov. 26, 1935 |
| 2,489,420 | Kirk et al. | Nov. 29, 1949 |